(12) United States Patent
Muraji (10) Patent No.: US 6,820,590 B2
(45) Date of Patent: Nov. 23, 2004

(54) DRIVING APPARATUS WITH NON-CIRCULAR GEAR

(75) Inventor: Tetsuo Muraji, Kanagawa (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 10/390,599

(22) Filed: Mar. 19, 2003

(65) Prior Publication Data

US 2003/0209227 A1 Nov. 13, 2003

Related U.S. Application Data

(63) Continuation of application No. PCT/JP01/08055, filed on Sep. 17, 2001.

(30) Foreign Application Priority Data

Sep. 20, 2000 (JP) ......................................... 2000-284592

(51) Int. Cl.[7] ............................ F02D 11/10; H02K 26/00
(52) U.S. Cl. .................................. 123/399; 251/129.11
(58) Field of Search ................................ 123/361, 399; 251/129.01, 129.11; 74/63, 640

(56) References Cited

U.S. PATENT DOCUMENTS

| 4,030,352 | A | * | 6/1977 | Smith et al. ................ 73/118.1 |
| 4,838,226 | A | * | 6/1989 | Matsuzawa et al. ........ 123/399 |
| 5,547,360 | A | * | 8/1996 | Yokoyama .................. 425/149 |
| 5,562,081 | A | * | 10/1996 | Hitchcock .................... 123/399 |
| 6,247,447 | B1 | | 6/2001 | Muraji ........................ 123/399 |

FOREIGN PATENT DOCUMENTS

| JP | 58-091956 | | 6/1983 | |
| JP | 8-230638 | * | 9/1996 | ............ F02D/9/02 |
| JP | 11-225465 | | 8/1999 | |
| JP | 11-266575 | | 9/1999 | |
| JP | 2000-240474 | | 9/2000 | |

* cited by examiner

Primary Examiner—Tony M Argenbright
(74) Attorney, Agent, or Firm—Wenderoth, Lind & Ponack, L.L.P.

(57) ABSTRACT

The present driving apparatus comprises a torque motor as a driving source, and a gear train which transmits rotation of a motor shaft of the torque motor to a driven shaft, wherein the gear train comprises a non-circular driving gear which is attached to the motor shaft and a non-circular driven gear which is attached to the driven shaft and engaged with the non-circular driving gear. When the motor shaft rotates by supplying electric power to the torque motor, the rotation is transmitted to the non-circular driven gear via the non-circular driving gear, so that the driven shaft rotates. Here, the torque of the torque motor is transmitted to the driven gear while it is increased or decreased in accordance with rotating positions. In this manner, the driving apparatus with a torque motor can provide desired torque at any rotating position.

9 Claims, 8 Drawing Sheets

DRIVING APPARATUS WITH NON-CIRCULAR GEAR

This application is a continuation of PCT/JP01/08055 filed Sep. 17, 2001.

TECHNICAL FIELD

The present invention relates to a driving apparatus utilized for rotating position control, such as an electronic control throttle body or the like.

BACKGROUND ART

Conventionally, a torque motor is used as an actuator for an electronic throttle body for an internal combustion engine. With this kind of motor, it is possible to magnetize a rotor itself. However, generally, a ring-shaped magnet is stuck on a rotor so that the rotating position is controlled in accordance with the changes of magnetic flux distribution generated by a coil and magnetic path.

With a throttle body, the rotating range of a throttle valve to open and close an intake passage is about 90 degrees. Therefore, all of the ring-shaped magnet is not needed to drive and control within this range. Furthermore, the magnetic flux density of the magnet used for the rotor is high, resulting in high cost.

Figure 7:
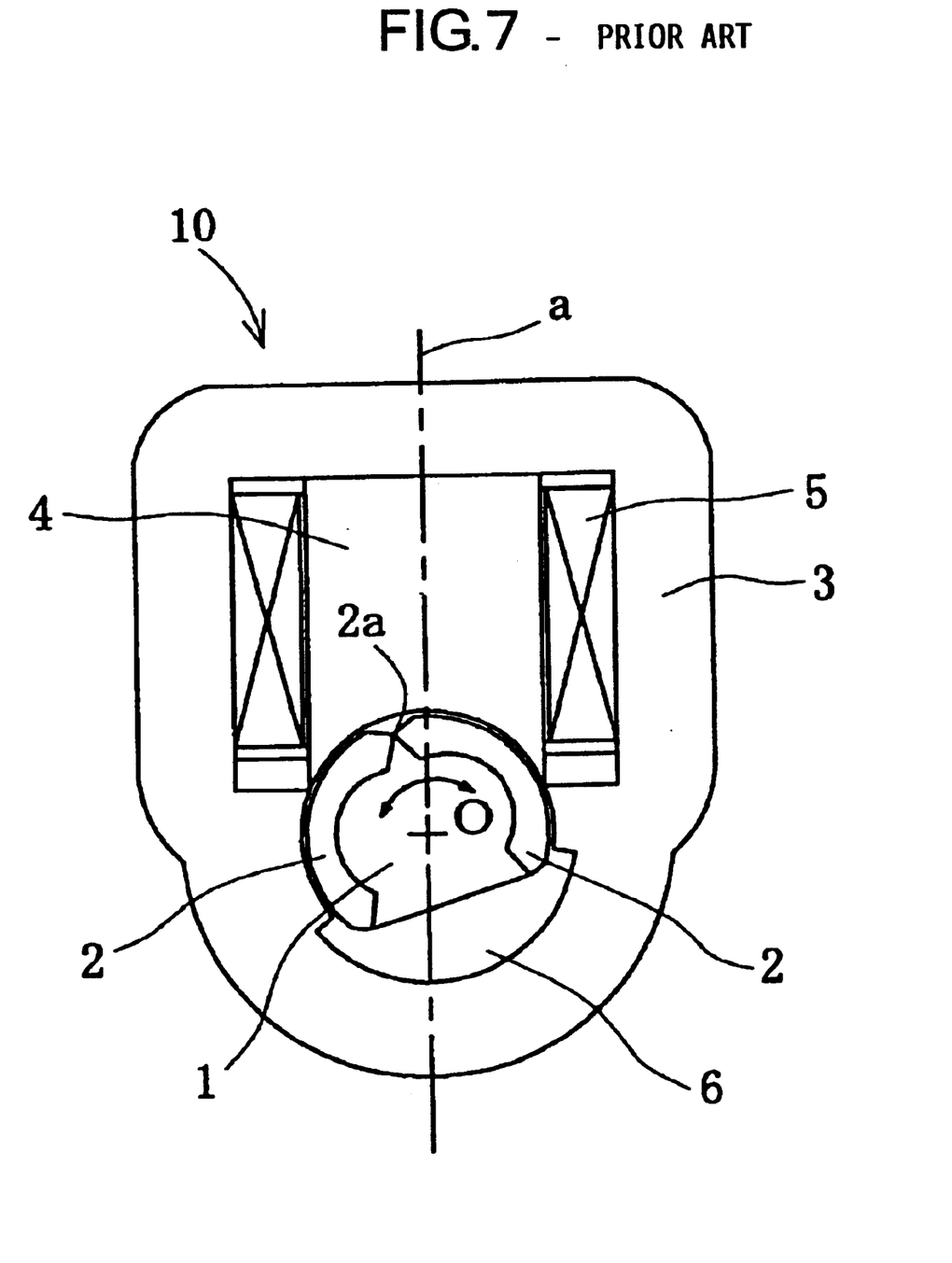
FIG. 7 shows a structure of a conventional torque motor.

Consequently, as shown in FIG. 7, a torque motor with segment-type magnets was devised. In this figure, numeral 1 is a rotor, and two segment-type magnets 2, 2 cover about two thirds of the circumference of the rotor 1. A yoke 3 and a core 4 are disposed so that there is some air-gap about the circumference of the magnet 2. A coil 5 is disposed at the core 4. Numeral 6 is a default opening adjusting groove to set a stop position for the rotor when power is not applied.

With the abovementioned structure, when power is applied to the coil 5, the rotor 1 rotates about an axis O, and the throttle valve which is connected directly to the rotor 1 opens and closes. In this example, because magnets 2, 2 cover two thirds of the circumference of the rotor 1, its rotating angle is about 120 degrees. The rotating direction of the rotor 1 changes in accordance with the direction of the electric current which is passing through the coil 5.

Figure 8:
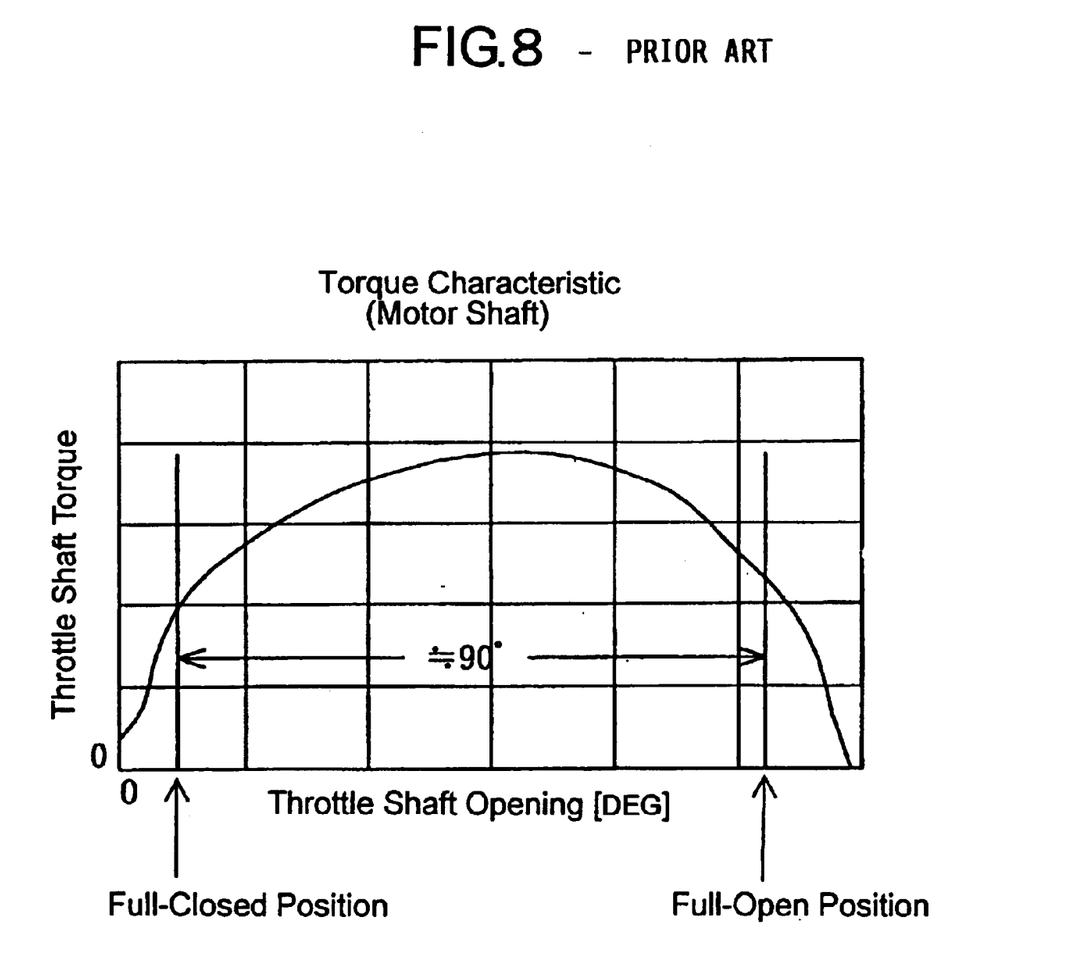
FIG. 8 is a diagram showing relations between a motor shaft opening and motor shaft torque of the conventional motor.

With the abovementioned torque motor 10, the torque generated at the rotor 1 is not constant. As shown in FIG. 8, the torque is maximum at the center of the rotating position (the position where the boundary 2a between the two magnets 2, 2 overlaps with the center line a of the torque motor, in FIG. 7). The torque becomes small as it rotates from this position to the left or the right, and the torque is minimum at both ends of the rotating range. This is a characteristic of the torque motor 10 which has the abovementioned structure, caused by magnetic circuit, such as magnetizing angles of the magnets, magnetic saturation and so on.

When this torque motor 10 is used for opening and closing a throttle valve, as shown in FIG. 8, a full-closed position (an idling position) and a full-open position of the throttle valve are in the vicinity of each end of the operating range respectively. Namely, they correspond to positions with small torque.

Here, in the small opening range including the full-closed position, quick response is needed because this range is used frequently. Furthermore, in this range, excess torque is needed to overcome throttle valve sticking problems which can easily occur due to icing or deposits.

The present invention is devised in consideration of the abovementioned situation, and the object is to provide a driving apparatus with a non-circular gear which can output required torque at a specific rotating position, such as the small opening range of the throttle body.

DISCLOSURE OF THE INVENTION

To achieve the abovementioned object, the driving apparatus of the present invention comprises a torque motor as a driving source, and a gear train which transmits rotation of a motor shaft of the torque motor to a driven shaft, wherein the gear train comprises a non-circular driving gear which is attached to the motor shaft and a non-circular driven gear which is attached to the driven shaft and engaged with the non-circular driving gear.

Furthermore, a structure wherein either the non-circular driving gear or the non-circular driven gear is a sector type gear having an oval shape, or a structure wherein the non-circular driven gear is disposed at a throttle shaft which controls intake-air amount to an internal combustion engine can be adopted.

The torque motor can be a motor which has a rotating range less than 360 degrees and which changes the torque in accordance with the rotating angle.

With the driving apparatus of the present invention, when the torque motor rotates, the rotation is transmitted to the driven shaft via a gear train. The gear train includes the non-circular driving gear and the non-circular driven gear. Because of the engagement of these gears, the rotating velocity of the driven shaft is not constant, namely, rotating velocity of some ranges is high and that of other ranges is low. Here, the torque transmitted to the driven shaft in the high velocity range is smaller, and is larger in the low velocity range than the torque of the motor shaft. By designing the non-circular gear appropriately, it is possible to obtain desired torque at a desired rotating position, for example, to obtain increased torque when the driven gear is at the specific rotating position.

DETAILED DESCRIPTION OF THE INVENTION

Figure 1:
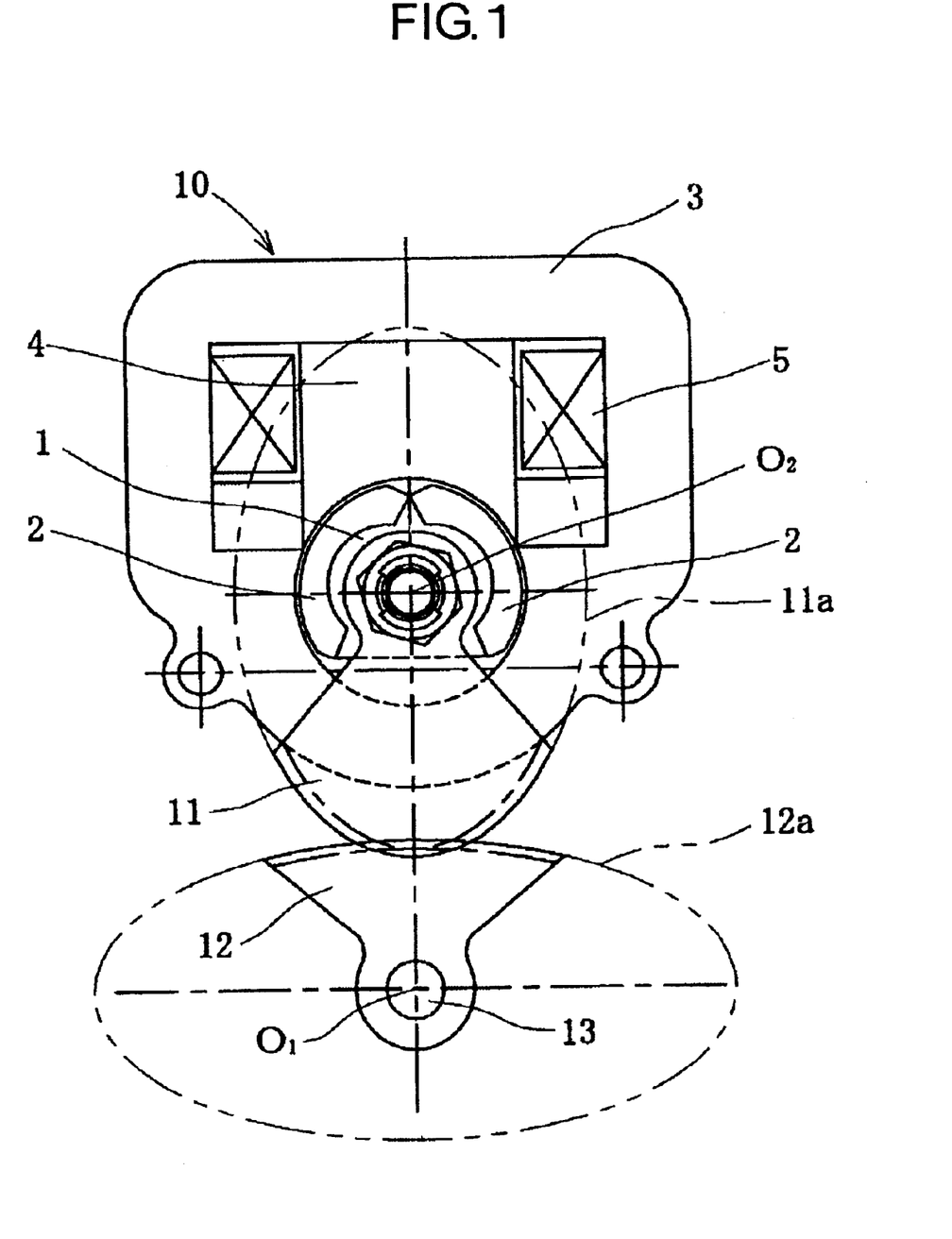
FIG. 1 shows a structure of a driving apparatus with non-circular gears, according the present invention.

An embodiment of the present invention is explained in the following in accordance with the drawings. FIG. 1 shows a structure of a driving apparatus with non-circular gears, according to the present invention. The structure of a torque motor 10 is generally the same as that of a conventional example. Conventionally, a throttle valve is connected directly to a rotor 1 as a motor shaft. In the present invention, a non-circular driving gear (hereinafter referred as a driving gear) 11 is attached to the rotor 1, and a non-circular driven gear (hereinafter referred as a driven gear) 12 which is engaged with the driving gear, is attached to a throttle shaft 13. The present invention is characterized in that desired torque is obtained at a desired position by utilizing a non-circular gear.

The driving gear 11 is a sector type gear having its pitch curve defined by a part of a vertically oriented oval 11a. The driven gear 12 is a sector type gear having its pitch curve defined by a part of a horizontally oriented oval 12a that is orthogonal to the oval 11a. As explained above, the embodiment of FIG. 1 adopts oval gears. However, non-circular gears are not limited to the oval gears 11, 12, and various pitch curves can be used.

Incidentally, in this specification, the term "sector type gear" is not limited to a normal sector-shaped sector type gear having its pitch curve defined by a segment of a circle. Rather, the term encompasses any gear having a pitch curve defined by any of various curves, such as an oval arc and so on, and which pitch curve is not closed as a tube shape.

Next is an explanation of how to determine the shape of a pitch curve of the non-circular gear, namely, the shape of the gear.

Figure 2:
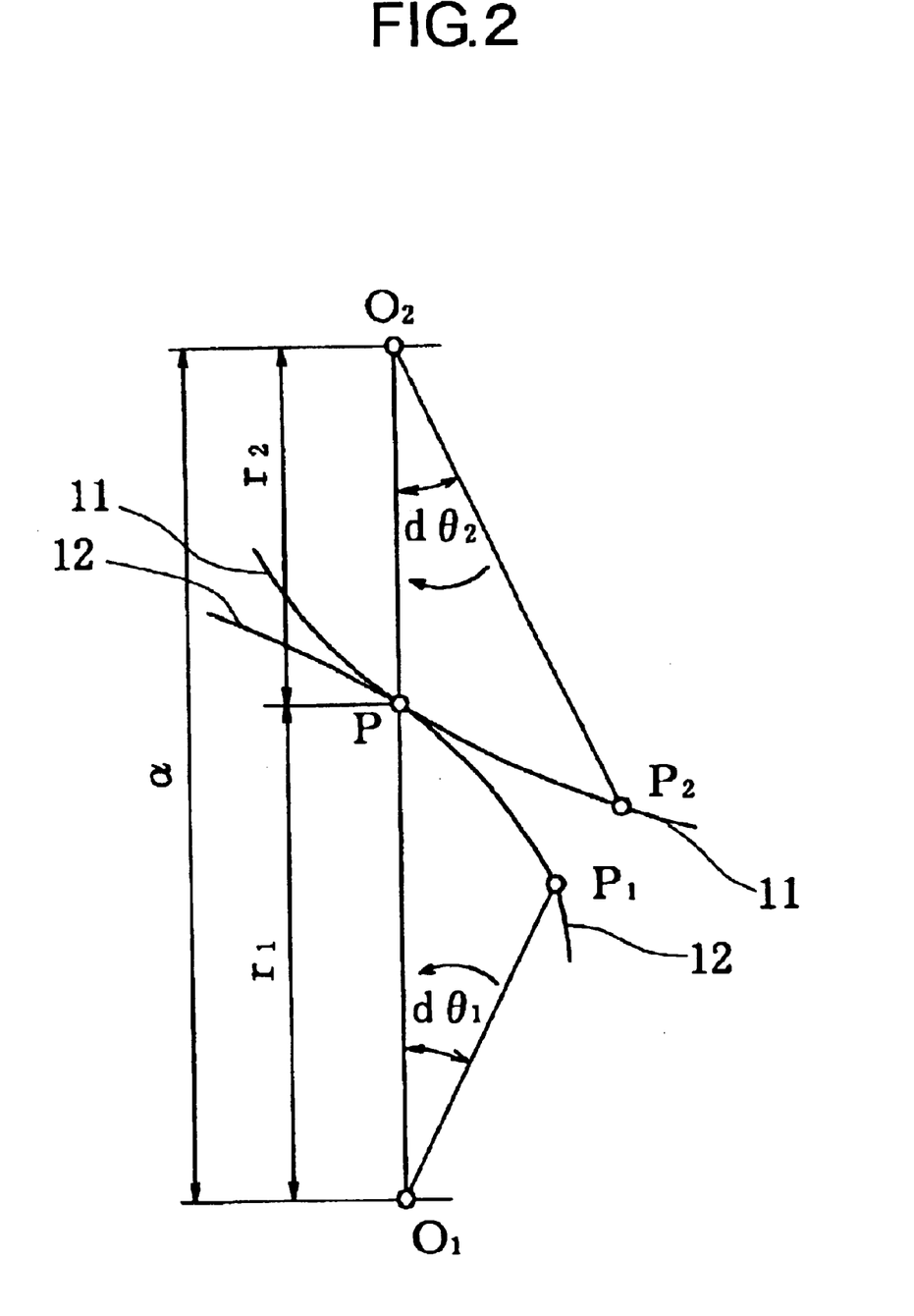
FIG. 2 explains how to determine pitch curves of a non-circular driving gear and a non-circular driven gear.

FIG. 2 explains how to determine the shapes of the pitch curves of a driving gear 11 and a driven gear 12. As shown in this figure, the center of the driving gear 11 is $O_2$, the center of the driven gear 12 is $O_1$, and both pitch curves of the driving gear 11 and the driven gear 12 are in contact with each other at point P. Then, if the driving gear 11 rotates clockwise (plus direction) by a small angle $d\theta_2$ and the driven gear 12 rotates counter-clockwise (minus direction) by $d\theta_1$, so that point $P_1$ and point $P_2$ are to be in contact with each other, the following equations hold.

$$r_1 + r_2 = \alpha \quad (1)$$

$$r_1 \cdot d\theta_1 = r_2 \cdot d\theta_2 \quad (2)$$

On the condition that $\alpha=1$, $r_1$ and $r_2$ are given by the equation (1) and equation (2) as follows.

$$r_1 = (-d\theta_2/d\theta_1)/\{1-(d\theta_2/d\theta_1)\} \quad (3)$$

$$r_2 = 1/\{1-(d\theta_2/d\theta_1)\} \quad (4)$$

Here, $-d\theta_2/d\theta_1$ represents an angular velocity ratio. Therefore, giving the angular velocity ratio to the equation (3) and equation (4), the radiuses $r_1$, $r_2$ of pitch circles at that angle are determined linearly.

Namely, the following equations hold between torque $T(\theta_1)$ of the torque motor 10 at the rotating angle $\theta_1$, and torque $T(\theta_2)$ which is transmitted to the driven gear.

$$T(\theta_2) = T(\theta_1) \cdot (d\theta_2/d\theta_1) = (r_1/r_2) \cdot T(\theta_1) \quad (5)$$

Given $T(\theta_2)$, $r_1$ and $r_2$ can be determined by the equations (3) (4) and (5).

Consequently, by drawing a diagram in which desired torque $T(\theta_2)$ is plotted for every opening between full-closed and full-open of a throttle valve, the pitch curves of the driving gear 11 and the driven gear 12 are obtained in accordance with the diagram.

Figure 3:
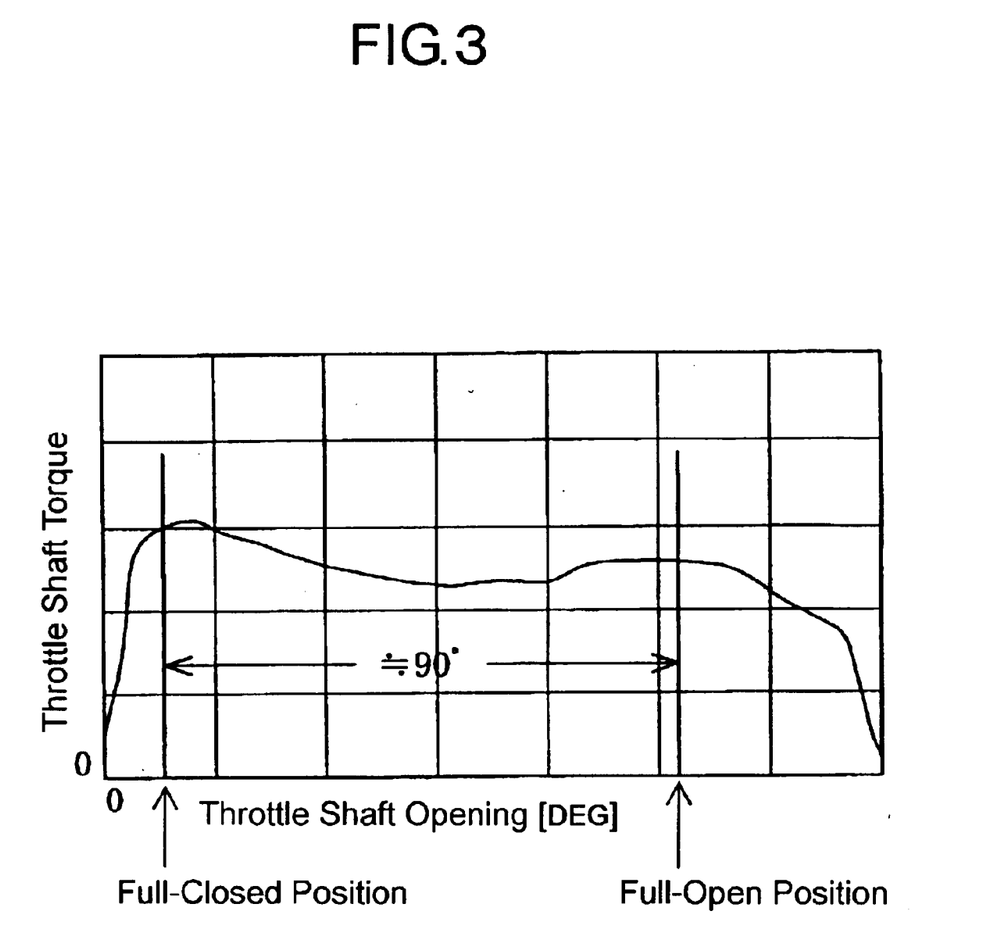
FIG. 3 is a diagram showing relations between a throttle shaft opening and throttle shaft torque.

When oval gears are adopted for the driving gear 11 and driven gear 12 as the embodiment of FIG. 1, relations between the throttle shaft opening and the throttle shaft torque are as shown in the diagram of FIG. 3. Specifically, maximum torque is obtained at the full-closed position where the maximum load may exist. The torque is maximum at the full-closed position, and gradually decreases toward the full-open position.

Figure 4:
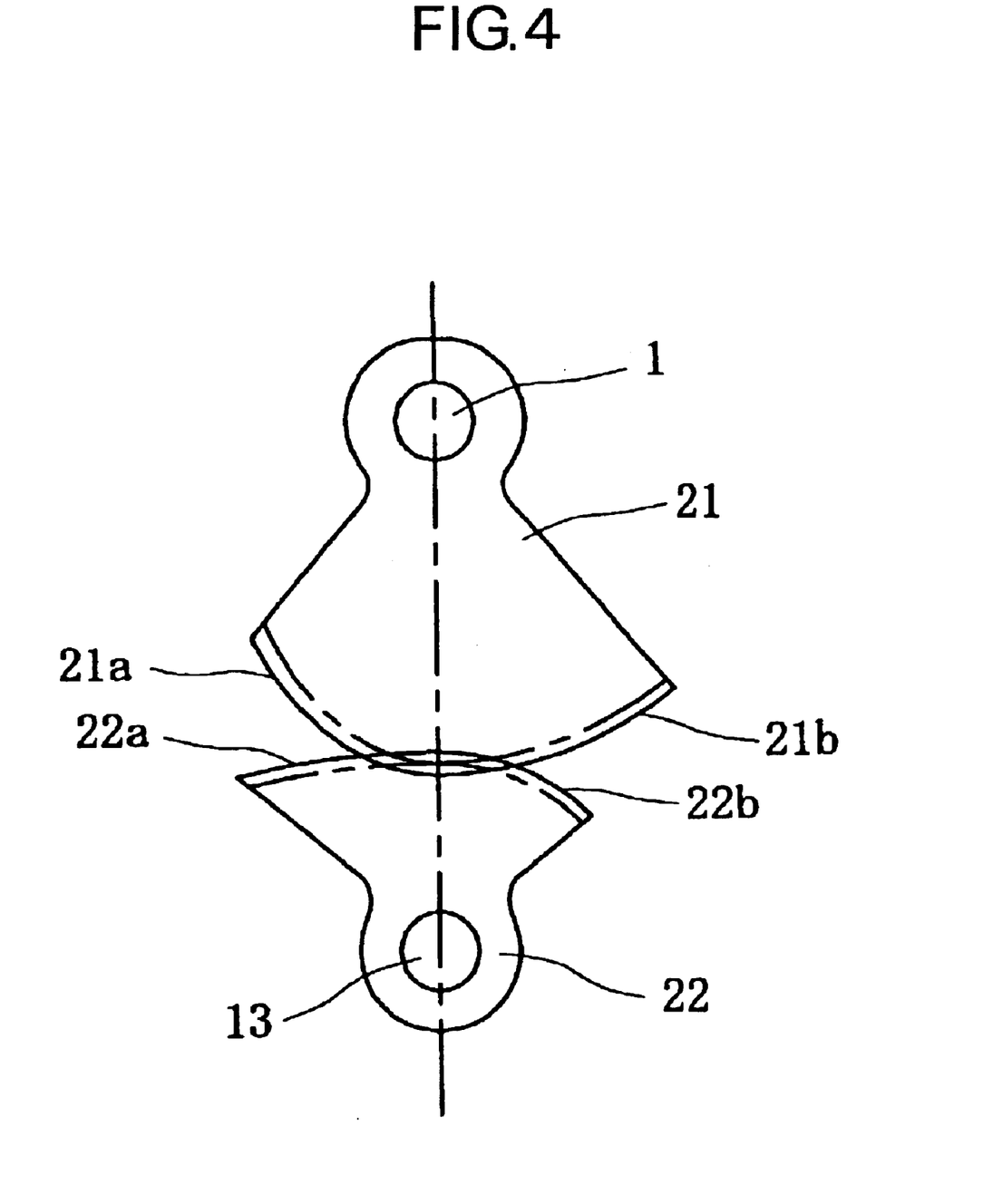
FIG. 4 shows a main part of a second embodiment of the present invention showing shapes of the non-circular driving gear and a non-circular driven gear.

FIG. 4 shows a main part of the second embodiment of the present invention showing shapes of the driving gear 21 and a driven gear 22. The driving gear 21 is the gear of the rotor 1 side, and the driven gear 22 is the gear of the throttle shaft 13 side. In this figure, pitch curves 21a, 22a which are located at the left side of the center line are the same oval arcs as the pitch curves of the oval gears 11, 12 in FIG. 1. The pitch curves 21b, 22b at the right side of the center line are segments of circles. The portions of the oval gears 11, 12 are for a small opening range, and the portions of the circle gears are for a large opening range. In this embodiment, since sector type gears are adopted, pitch curves of the gears can be designed as desired as abovementioned.

Figure 5:
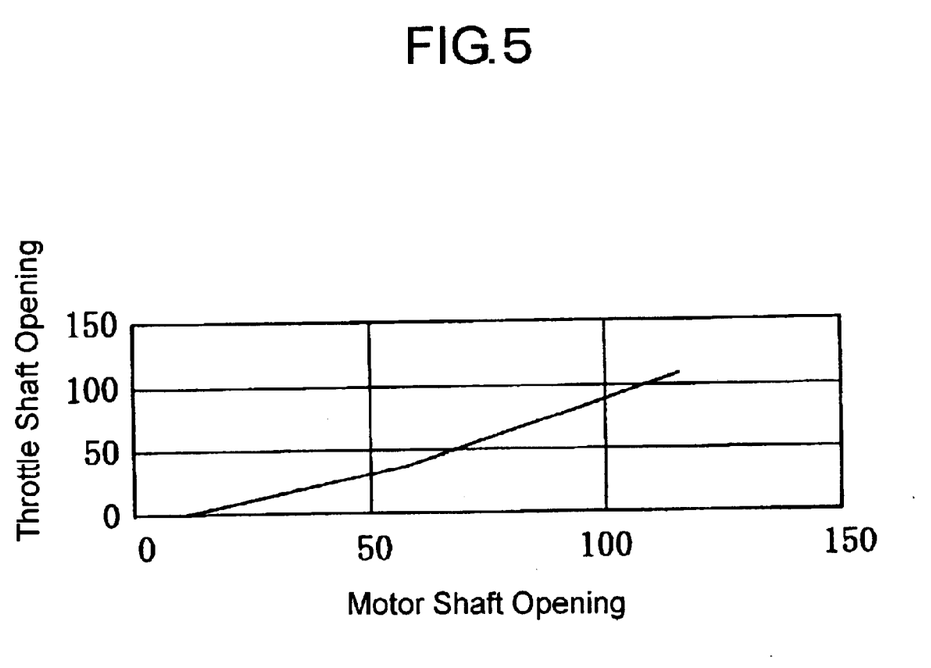
FIG. 5 is a diagram showing relations between a throttle shaft opening and a motor shaft opening of the second embodiment.

FIG. 5 is a diagram showing relations between a throttle shaft opening and a motor shaft opening of the second embodiment. The motor shaft opens gradually when the throttle shaft opening is in a small opening range, and opens rapidly in a large opening range.

Figure 6:
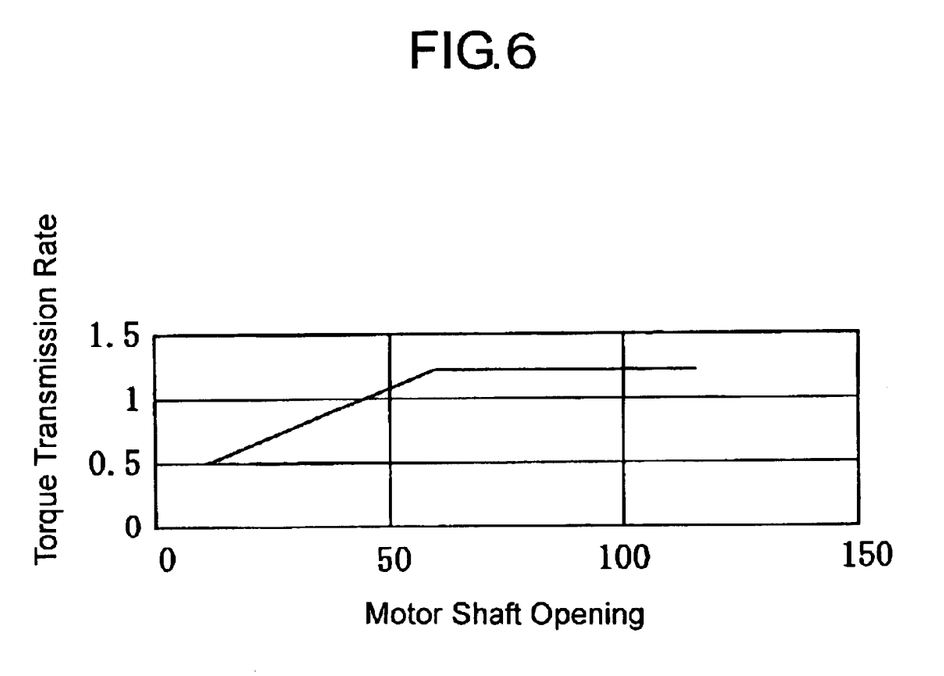
FIG. 6 is a diagram showing relations between a torque transmission rate and a motor shaft opening of the second embodiment.

FIG. 6 is a diagram showing relations between a torque transmission rate and a motor shaft opening of the second embodiment. The transmission rate increases gradually when the motor shaft opening is in a small opening range, and the transmission rate is constant in a large opening range. Large torque is obtained when the throttle shaft is at the full-closed position, because the smaller the motor shaft opening is, the smaller the transmission rate is. In this embodiment, the torque increase effect by the oval gears is produced only in a small opening range of the throttle shaft, while normal driving by the circle gears is performed so that the torque is not increased or decreased in a large opening range of the throttle shaft.

Although not shown in figures, instead of an oval gear, an eccentric gear whose axis is off-centered relative to the axis of a circle gear can be used as a non-circular gear. In this case, forming the gear is easier than the case of the oval gear. Furthermore, it is certainly possible to adopt a sector type gear.

In the abovementioned embodiment, the driving gear 11 is attached to the rotor 1, and the driven gear 12 is attached to the throttle shaft 13. However, it is not limited to such a structure. For example, similar effects can be obtained even when normal circle gears are attached to the rotor 1 and the throttle shaft 13 between which a non-circular gear is disposed.

INDUSTRIAL APPLICABILITY

The driving apparatus of the present invention comprises a torque motor as a driving source, and a gear train which transmits rotation of a motor shaft of the torque motor to a driven shaft, wherein the gear train comprises a non-circular driving gear which is attached to the motor shaft and a non-circular driven gear which is attached to the driven shaft and engaged with the non-circular driving gear. With this structure, the torque transmitted to the driven shaft can easily be increased or decreased to meet the requirement.

With the structure wherein either the non-circular driving gear or the non-circular driven gear is a sector type gear having an oval shape, it is possible to obtain various torque characteristics and to make the apparatus compact. With the structure wherein the non-circular driven gear is disposed at a throttle shaft which controls the intake-air amount to an internal combustion engine, it is possible to make the torque maximum in a small opening range including a full-closed position of a throttle valve.

What is claimed is:

1. A driving apparatus comprising:

a driving source comprising a torque motor with a motor shaft having a motor shaft rotational axis;

a driven shaft having a driven shaft rotational axis; and a gear train operably coupling said motor shaft to said driven shaft so as to transfer rotation of said motor shaft to said driven shaft;

wherein said gear train comprises a non-circular driving gear attached to said motor shaft, and a non-circular driven gear attached to said driven shaft and engaged with said non-circular driving gear;

wherein said non-circular driving gear has a rotating range through which said non-circular driving gear engages with said non-circular driven gear;

wherein said non-circular driven gear has a rotating range through which said non-circular driven gear engages with said non-circular driving gear; and wherein said non-circular driving gear and said non-circular driven gear are shaped and arranged such that, with said non-circular driving gear and said non-circular driven gear both positioned at centers of their respective rotating ranges so as to define a driving gear periphery center and a driven gear periphery center at their respective engaged peripheral centers, a distance from said motor shaft rotational axis to said driving gear periphery center is greater than a distance from said driven shaft rotational axis to said driven gear periphery center.

2. The driving apparatus according to claim 1, wherein said non-circular driving gear comprises a sector type gear having a shape constituted by a sector of an oval; and said non-circular driven gear comprises a sector type gear having a shape constituted by a sector of an oval.

3. The driving apparatus according to claim 2, wherein said driven shaft is constituted by a throttle shaft which controls intake-air amount to an internal combustion engine.

4. The driving apparatus according to claim 2, wherein the major axis of the oval from which the shape of the non-circular driving gear is constituted is perpendicular to the major axis of the oval from which the shape of the non-circular driven gear is constituted, with said non-circular driving gear and said non-circular driven gear both positioned at centers of their respective rotating ranges.

5. The driving apparatus according to claim 1, wherein said non-circular driving gear comprises a sector type gear having a shape constituted partly by a sector of an oval and partly by a sector of a circle; and said non-circular driven gear comprises a sector type gear having a shape constituted partly by a sector of an oval and partly by a sector of a circle.

6. The driving apparatus according to claim 5, wherein said driven shaft is constituted by a throttle shaft which controls intake-air amount to an internal combustion engine.

7. The driving apparatus according to claim 1, wherein said driven shaft is constituted by a throttle shaft which controls intake-air amount to an internal combustion engine.

8. A driving apparatus comprising:

a driving source comprising a torque motor with a motor shaft having a motor shaft rotational axis;

a driven shaft having a driven shaft rotational axis; and a gear train operably coupling said motor shaft to said driven shaft so as to transfer rotation of said motor shaft to said driven shaft;

wherein said gear train comprises a non-circular driving gear attached to said motor shaft, and a non-circular driven gear attached to said driven shaft and engaged with said non-circular driving gear;

wherein said non-circular driving gear has a rotating range through which said non-circular driving gear engages with said non-circular driven gear;

wherein said non-circular driven gear has a rotating range through which said non-circular driven gear engages with said non-circular driving gear;

wherein said non-circular driving gear comprises a sector type gear having a shape constituted by a sector of an oval; and wherein said non-circular driven gear comprises a sector type gear having a shape constituted by a sector of an oval; and wherein the major axis of the oval from which the shape of the non-circular driving gear is constituted is perpendicular to the major axis of the oval from which the shape of the non-circular driven gear is constituted, with said non-circular driving gear and said non-circular driven gear both positioned at centers of their respective rotating ranges.

9. The driving apparatus according to claim 8, wherein said driven shaft is constituted by a throttle shaft which controls intake-air amount to an internal combustion engine.

* * * * *